(12) United States Patent
Furlong et al.

(10) Patent No.: US 8,824,094 B1
(45) Date of Patent: Sep. 2, 2014

(54) HARD DISK DRIVE HAVING MULTIPLE DISK STACKS AND A MOVABLE HEAD STACK ASSEMBLY

(71) Applicant: HGST Netherlands B.V., Amsterdam (NL)

(72) Inventors: Jeffrey L. Furlong, Irvine, CA (US); Toshiki Hirano, San Jose, CA (US); Tatsuo Nakamoto, Sagamihara (JP)

(73) Assignee: HGST Netherlands B.V., Amsterdam (NL)

( * ) Notice: Subject to any disclaimer, the term of this patent is extended or adjusted under 35 U.S.C. 154(b) by 0 days.

(21) Appl. No.: 14/057,641

(22) Filed: Oct. 18, 2013

(51) Int. Cl.
*G11B 17/038* (2006.01)

(52) U.S. Cl.
USPC .................................................. 360/98.01

(58) Field of Classification Search
USPC .................................................. 360/98.01
See application file for complete search history.

(56) References Cited

U.S. PATENT DOCUMENTS

| | | | |
|---|---|---|---|
| 3,864,747 A | 2/1975 | Pejcha | |
| 4,019,205 A | 4/1977 | Salmond et al. | |
| 5,343,345 A | 8/1994 | Gilovich | |
| 5,415,471 A | 5/1995 | Dalziel | |
| 5,449,091 A | 9/1995 | Dalziel | |
| 5,777,957 A | 7/1998 | Lyman | |
| 6,005,831 A | 12/1999 | Park | |
| 6,115,215 A | 9/2000 | Adams et al. | |
| 6,208,489 B1 * | 3/2001 | Marchon | 360/294.7 |
| 6,449,130 B1 | 9/2002 | Koyama | |
| 7,475,409 B2 | 1/2009 | Yamagami et al. | |
| 7,596,060 B2 | 9/2009 | Li | |
| 7,760,463 B2 | 7/2010 | Ward et al. | |
| 8,028,311 B2 | 9/2011 | Gilovich | |
| 8,112,580 B2 | 2/2012 | Bandic et al. | |

FOREIGN PATENT DOCUMENTS

EP 0895237 A1 2/1999

OTHER PUBLICATIONS

Andrew, Kane, "Unusual Disk Optimization Techniques", University of Waterloo, Oct. 28, 2009, 33 pp., URL: https://cs.uwaterloo.ca/~arkane/Presentation%20-%20Unusual%20Disk%20Optimization%20Techniques.pdf.

* cited by examiner

*Primary Examiner* — Mark Blouin
(74) *Attorney, Agent, or Firm* — John D. Henkhaus

(57) ABSTRACT

A lower cost per unit of storage hard disk drive (HDD) includes multiple disk stacks and a head stack assembly (HSA) movably coupled to a rail for accessing magnetic-recording disks of each of the multiple disk stacks. Such an HDD may include multiple columns of linearly-arranged disk stacks with an HSA corresponding to each column, where the disk stacks on each side of the rail are positioned for asynchronous access by the HSA, and may include multiple HSAs coupled to the rail, where the disk stacks on each side of the rail are positioned for simultaneous access by respective HSAs being moved either synchronously or independently.

18 Claims, 4 Drawing Sheets

HARD DISK DRIVE HAVING MULTIPLE DISK STACKS AND A MOVABLE HEAD STACK ASSEMBLY

FIELD OF THE INVENTION

Embodiments of the invention relate generally to hard disk drive (HDD) storage devices and more particularly to lowering the cost per unit of storage capacity.

BACKGROUND

A hard disk drive (HDD) is a non-volatile storage device that is housed in a protective enclosure and stores digitally encoded data on one or more circular disks having magnetic surfaces. When an HDD is in operation, each magnetic-recording disk is rapidly rotated by a spindle system. Data is read from and written to a magnetic-recording disk using a read/write head that is positioned over a specific location of a disk by an actuator.

A read/write head uses a magnetic field to read data from and write data to the surface of a magnetic-recording disk. Write heads make use of the electricity flowing through a coil, which produces a magnetic field. Electrical pulses are sent to the write head, with different patterns of positive and negative currents. The current in the coil of the write head induces a magnetic field across the gap between the head and the magnetic disk, which in turn magnetizes a small area on the recording medium.

While increasing areal density, a measure of the quantity of information bits that can be stored on a given area of disk surface, is one of the ever-present holy grails of HDD design evolution, the cost per unit of storage is also an ever-present constraint associated with HDD development. The cost per storage capacity, or price per capacity from a consumer's standpoint, is especially important in large data storage scenarios, such as with archival and backup storage in which large amounts of data are stored but infrequently accessed.

SUMMARY OF EMBODIMENTS OF THE INVENTION

Embodiments are directed to a hard disk drive (HDD) having multiple disk stacks and a head stack assembly (HSA) movably coupled to a rail for accessing portions of one or more magnetic-recording disk of each of the multiple disk stacks. Thus, a lower cost HDD design is described which can be manufactured to have a lower cost per unit of storage.

Embodiments may include multiple columns of linearly-arranged disk stacks with an HSA corresponding to each column, and may include a gas deflector positioned between each adjacent column of disk stacks. Embodiments may include multiple HSAs coupled to the rail, where the disk stacks on each side of the rail are positioned for simultaneous access by respective HSAs, being moved either synchronously or independently.

Embodiments discussed in the Summary of Embodiments of the Invention section are not meant to suggest, describe, or teach all the embodiments discussed herein. Thus, embodiments of the invention may contain additional or different features than those discussed in this section.

BRIEF DESCRIPTION OF THE DRAWINGS

Embodiments of the invention are illustrated by way of example, and not by way of limitation, in the figures of the accompanying drawings and in which like reference numerals refer to similar elements and in which.

DETAILED DESCRIPTION

Described herein are approaches to a hard disk drive (HDD) having multiple disk stack assemblies which are serviced by one or more head stack assembly (HSA) movable along a guide rail or track. In the following description, for the purposes of explanation, numerous specific details are set forth in order to provide a thorough understanding of the embodiments of the invention described herein. It will be apparent, however, that the embodiments of the invention described herein may be practiced without these specific details. In other instances, well-known structures and devices are shown in block diagram form in order to avoid unnecessarily obscuring the embodiments of the invention described herein.

Physical Description of Illustrative Embodiments of the Invention

Figure 1:
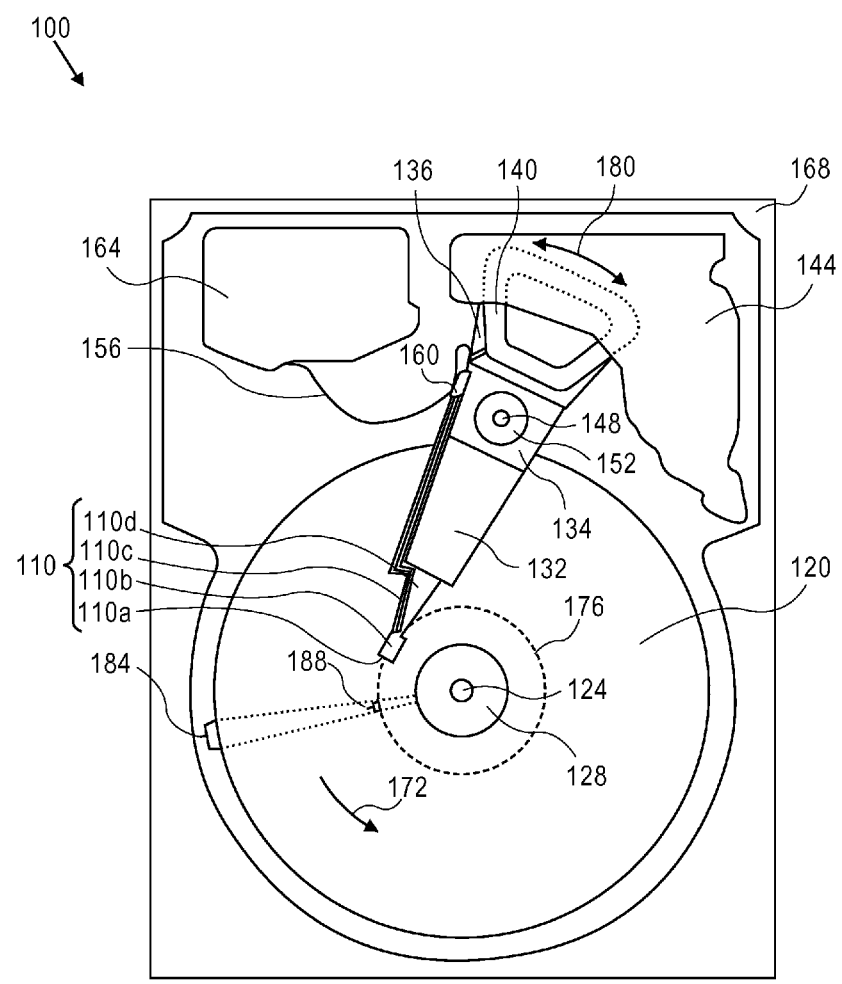
FIG. 1 is a plan view illustrating a conventional hard disk drive (HDD)

Embodiments of the invention relate to a hard disk drive (HDD). In accordance with an embodiment of the invention, a plan view illustrating a conventional HDD 100 is shown in FIG. 1. FIG. 1 illustrates the functional arrangement of components of the HDD including a slider 110b that includes a magnetic-reading/recording head 110a. Collectively, slider 110b and head 110a may be referred to as a head slider. The HDD 100 includes at least one head gimbal assembly (HGA) 110 including the head slider, a lead suspension 110c attached to the head slider, and a load beam 110d attached to the lead suspension 110c. The HDD 100 also includes at least one magnetic-recording media 120 rotatably mounted on a spindle 124 and a drive motor (not shown) attached to the spindle 124 for rotating the media 120. The head 110a includes a write element and a read element for respectively writing and reading information stored on the media 120 of the HDD 100. The media 120 or a plurality of disks may be affixed to the spindle 124 with a disk clamp 128.

The HDD 100 further includes an arm 132 attached to the HGA 110, a carriage 134, a voice-coil motor (VCM) that includes an armature 136 including a voice coil 140 attached to the carriage 134; and a stator 144 including a voice-coil magnet (not visible). The armature 136 of the VCM is attached to the carriage 134 and is configured to move the arm 132 and the HGA 110 to access portions of the media 120 being mounted on a pivot-shaft 148 with an interposed pivot-bearing assembly 152. In the case of an HDD having multiple disks, or platters as disks are sometimes referred to in the art, the carriage 134 is called an "E-block," or comb, because the carriage is arranged to carry a ganged array of arms that gives it the appearance of a comb.

An assembly comprising a head gimbal assembly (e.g., HGA 110) including a flexure to which the head slider is coupled, an actuator arm (e.g., arm 132) to which the flexure is coupled, and an actuator (e.g., the VCM) to which the actuator arm is coupled, may be collectively referred to as a head stack assembly (HSA). An HSA may, however, include more or fewer components than those described. For example, an HSA may refer to an assembly that further includes electrical interconnection components. Generally, an HSA is the assembly configured to move the head slider to access portions of the media 120 (e.g., magnetic-recording disks) for read and write operations.

With further reference to FIG. 1, in accordance with an embodiment of the present invention, electrical signals, for example, current to the voice coil 140 of the VCM, write signal to and read signal from the head 110a, are provided by a flexible interconnect cable 156 ("flex cable"). Interconnection between the flex cable 156 and the head 110a may be provided by an arm-electronics (AE) module 160, which may have an on-board pre-amplifier for the read signal, as well as other read-channel and write-channel electronic components. The AE 160 may be attached to the carriage 134 as shown. The flex cable 156 is coupled to an electrical-connector block 164, which provides electrical communication through electrical feedthroughs provided by an HDD housing 168. The HDD housing 168, also referred to as a casting, depending upon whether the HDD housing is cast, in conjunction with an HDD cover provides a sealed, protective enclosure for the information storage components of the HDD 100.

With further reference to FIG. 1, in accordance with an embodiment of the present invention, other electronic components (not visible), including a disk controller and servo electronics including a digital-signal processor (DSP), provide electrical signals to the drive motor, the voice coil 140 of the VCM and the head 110a of the HGA 110. The electrical signal provided to the drive motor enables the drive motor to spin providing a torque to the spindle 124 which is in turn transmitted to the media 120 that is affixed to the spindle 124 by the disk clamp 128; as a result, the media 120 spins in a direction 172. The spinning media 120 creates a cushion of air that acts as an air-bearing on which the air-bearing surface (ABS) of the slider 110b rides so that the slider 110b flies above the surface of the media 120 without making contact with a thin magnetic-recording medium in which information is recorded.

The electrical signal provided to the voice coil 140 of the VCM enables the head 110a of the HGA 110 to access a track 176 on which information is recorded. Thus, the armature 136 of the VCM swings through an arc 180 which enables the HGA 110 attached to the armature 136 by the arm 132 to access various tracks on the media 120. Information is stored on the media 120 in a plurality of stacked tracks (not shown) arranged in sectors on the media 120, for example, sector 184. Correspondingly, each track is composed of a plurality of sectored track portions, for example, sectored track portion 188. Each sectored track portion 188 is composed of recorded data and a header containing a servo-burst-signal pattern, for example, an ABCD-servo-burst-signal pattern, information that identifies the track 176, and error correction code information. In accessing the track 176, the read element of the head 110a of the HGA 110 reads the servo-burst-signal pattern which provides a position-error-signal (PES) to the servo electronics, which controls the electrical signal provided to the voice coil 140 of the VCM, enabling the head 110a to follow the track 176. Upon finding the track 176 and identifying a particular sectored track portion 188, the head 110a either reads data from the track 176 or writes data to the track 176 depending on instructions received by the disk controller from an external agent, for example, a microprocessor of a computer system.

Introduction

The cost per unit of storage, or price per storage capacity from a consumer's standpoint, is especially important in large data storage scenarios (also referred to as "Big Data"), such as with archival and backup storage in which large amounts of data are stored but infrequently accessed (also referred to as "cold storage"). Some example approaches to lowering the cost per unit of storage are to use larger diameter disks, more disks per disk stack, and the "elevator drive" with a head stack assembly moving vertically to service a large stack of disks.

Multiple Disk Stack, Single Head Stack Embodiments

One approach to lowering the cost per unit of storage is to increase the share of the total cost that the media represents, effectively amortizing cost contributors such as the read/write heads, electronics, and the like, over more media capacity and thus more overall storage capacity.

Figure 2:
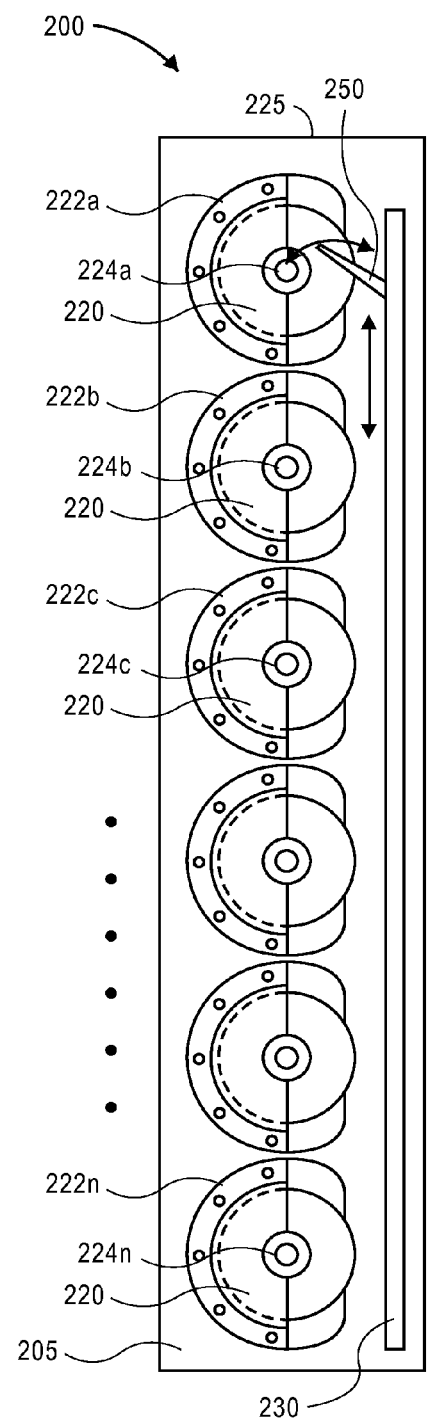
FIG. 2 is a plan view illustrating a multiple disk stack, single head stack assembly (HSA) HDD, according to an embodiment of the invention.

FIG. 2 is a plan view illustrating a multiple disk stack, single head stack assembly (HSA) hard disk drive (HDD), according to an embodiment of the invention. Some of the internal components of HDD 200 are largely similar to or the same as like components of HDD 100 (FIG. 1). Thus, for the purposes of clarity and simplicity, such like components are not necessarily depicted in FIG. 2 or described again in reference to FIG. 2. Reference is made to FIG. 1 and the corresponding description for the showing and description of the components of HDD 200 that are like components of HDD 100.

One difference between HDD 200 and HDD 100 (FIG. 1) is that HDD 200 comprises multiple disk stacks rather than the typical single disk stack, i.e., disk stacks 222a, 222b, 222c-222n (referred to hereafter collectively as 222a-222n), where n equals a total number of disk stacks per column, which may vary from implementation to implementation. Each disk stack 222a-222n comprises one or more disk 220. Preferably but not by way of limitation, each disk stack 222a-222n would comprise multiple disks, such as ten disks 220 per disk stack 222a-222n, to provide for a large storage capacity HDD. The one or more disk 220 of each disk stack 222a-222n is coupled to and rotated by a respective spindle, i.e., spindle 224a-224n.

According to an embodiment, each disk stack (e.g., disk stacks 222a-222n) is partially encased by a shroud, whereby a shaft associated with each spindle 224a-224n is fixed at each end to a respective shroud. The shroud provides for management of the air/gas flow occurring in and around the disk stack during read/write operations, e.g., to manage flow-induced vibration associated with the HSA 250 caused by turbulent air incident on the HSA 250.

Returning to FIG. 2, a group of multiple disk stacks 222a-222n are arranged linearly, such as in a column 225 of disk stacks. Each disk stack 222a-222n is fixed to a base 205. HDD 200 further comprises one or more head stack assembly (HSA) 250 movably coupled to a rail 230, to service the disks 220 of disk stacks 222a-222n. For example and according to an embodiment, each column 225 of disk stacks is serviced by a single HSA 250, which is configured to be moved (e.g., translated) along the rail 230, which is substantially parallel with the column 225 of disk stacks, and to be temporarily fixed into a certain and precise position along the rail 230 relative to each disk stack 222a-222n. According to an embodiment, the HSA 250 is moved on the rail 230 and mechanically locked into discrete positions along the path, where each position aligns to one disk stack, producing a repeatable and known position from which the HSA 250 can access the disks 220. The particular apparatus or system design (e.g., mechanical, electrical, electro-mechanical, etc.) for moving the HSA 250 along the rail 230 may vary from implementation to implementation. For non-limiting examples, one could implement a linear actuator, a ball screw mechanism, and the like, where a suitable feeding mechanism may be selected by one skilled in the relevant art based, for example, on the presence of particular design constraints and/or goals.

HSA 250 comprises similar components as shown and described in reference to FIG. 1, such as armature 136, voice coil 140 or another type of rotational actuating device, pivot-shaft 148, pivot-bearing assembly 152, carriage 134, arm 132, head gimbal assembly (HGA) 110, arm-electronics (AE) module 160, and flexible interconnect cable 156. Each HSA 250 is configured to move a respective one or more head slider to access portions of a magnetic-recording disk 220 of the disk stacks 222a-222n.

A particular system or apparatus design (e.g., mechanical, electrical, electro-mechanical, optical, etc.) utilized for precisely positioning, aligning and temporarily fixing HSA 250 relative to each disk stack 222a-222n may vary from implementation to implementation. For non-limiting examples, one could implement a slot and pin mechanism, a position sensor system, and the like, where a suitable positioning and fixing mechanism may be selected by one skilled in the relevant art based, for example, on the presence of particular design constraints and/or goals.

Figure 3:
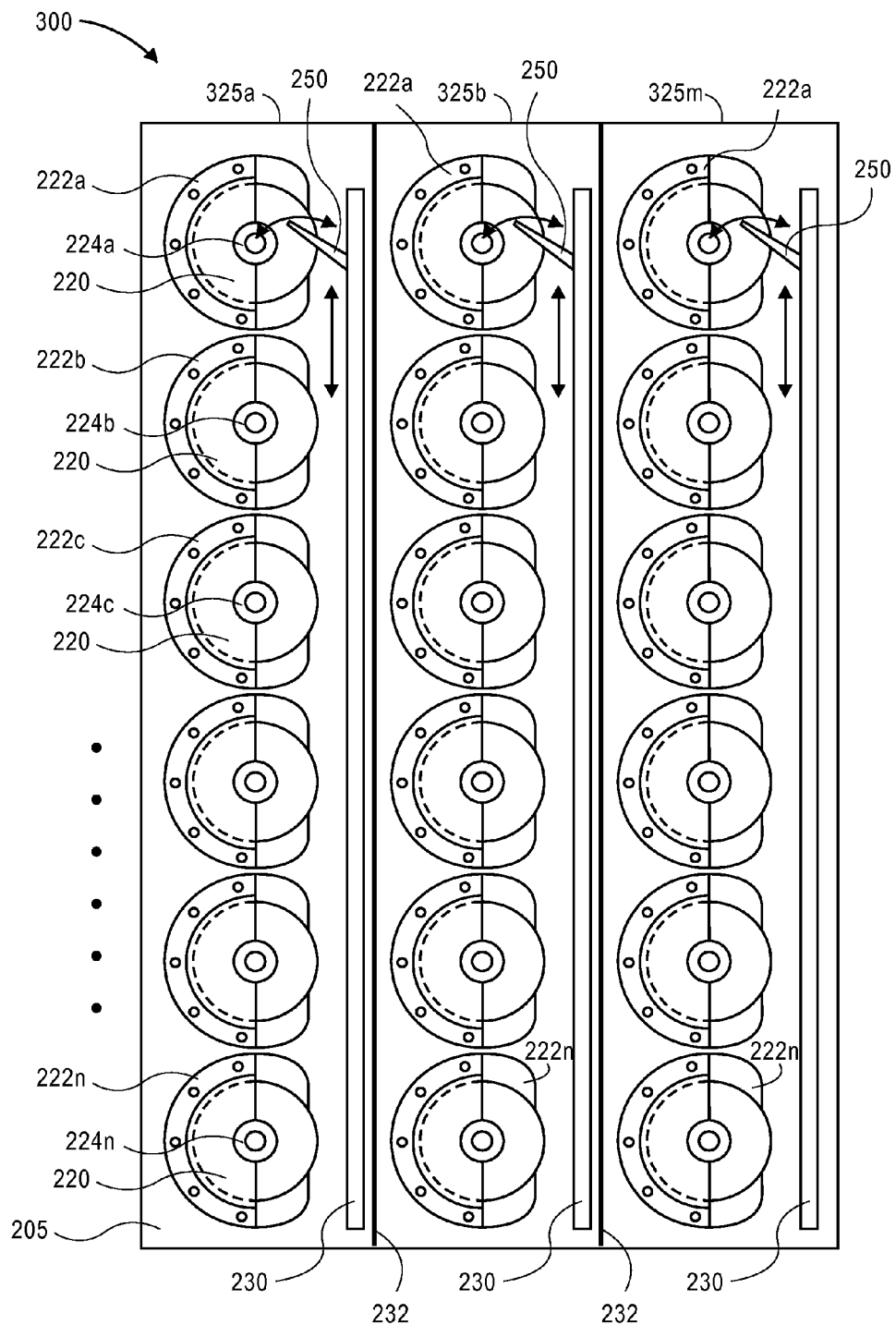
FIG. 3 is a plan view illustrating a multiple disk stack column HDD, according to an embodiment of the invention.

FIG. 3 is a plan view illustrating a multiple disk stack column HDD, according to an embodiment of the invention. HDD 300 comprises multiple columns 325a, 325b, 325m (referred to hereafter collectively as 325a-325m) of linearly-arranged disk stack groups such as disk stacks 222a-222n, where m equals a total number of columns, which may vary from implementation to implementation. Each disk stack column 325a-325m is associated with a corresponding HSA 250 configured to be translated along a corresponding rail 230 and to be fixed into a certain and precise position along the rail 230 relative to each disk stack 222a-222n. Some of the internal components of HDD 300 are largely similar to or the same as like components of HDD 100 (FIG. 1). Thus, for the purposes of clarity and simplicity, such like components are not necessarily depicted in FIG. 3 or described again in reference to FIG. 3. Reference is made to FIG. 1 and the corresponding description for the showing and description of the components of HDD 300 that are like components of HDD 100.

Each HSA 250 is configured to move a respective one or more head slider to access portions of a magnetic-recording disk 220 of the disk stacks 222a-222n. In a single-HSA 250 embodiment (e.g., HDD 200 of FIG. 2, HDD 300 of FIG. 3), each disk stack 222a-222n is accessed asynchronously, i.e., one disk stack 222a-222n at a time, after the respective HSA 250 is moved along the rail 230 to a fixed position relative to the respective disk stack.

HDD 300 further comprises a deflector 232 positioned between each adjacent disk stack column 325a-325m. Each deflector 232 serves to protect the spinning disk(s) 220 of disk stacks 222a-222n of one disk stack column (e.g., column 325a) from the airflow and turbulence from spinning disk(s) 220 of disk stacks 222a-222n of an adjacent disk stack column (e.g., column 325b). Further, each deflector 232 may form an internal enclosure for each respective disk stack column 325a-325m and corresponding HSA 250. According to an embodiment, each internal enclosure may be sealed from an adjacent internal enclosure, further enhancing the protection of the disk(s) 220 and HSA 250 from flow-induced vibration. According to one embodiment, one or more of the internal enclosures formed in part by a deflector 232 is filled with helium, further enhancing the protection of the disk(s) 220 and HSA 250 from flow-induced vibration, due to the lower density of helium compared to ambient air.

Multiple Disk Stack, Multiple Head Stack Embodiments

Figure 4:
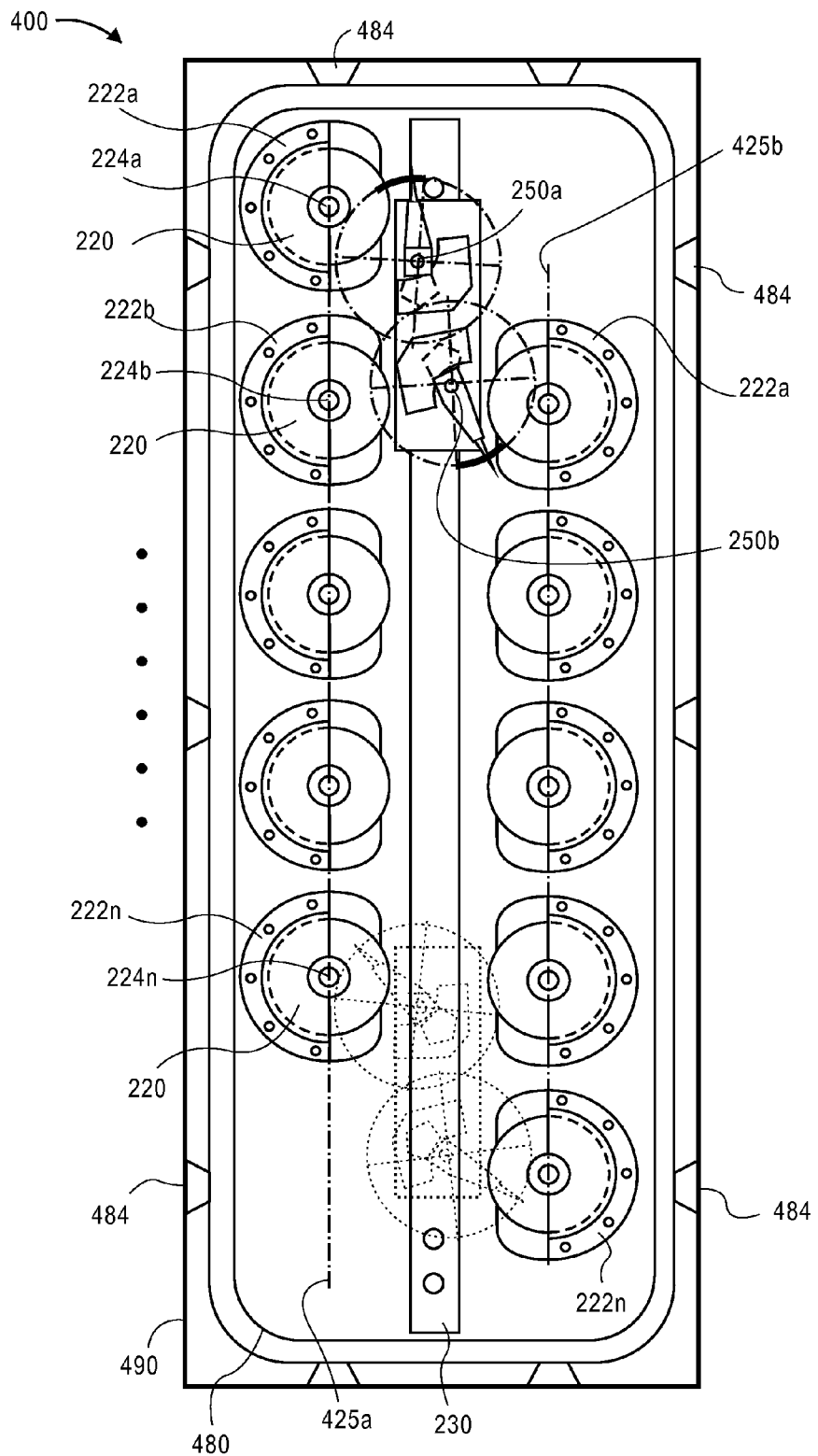
FIG. 4 is a plan view illustrating a multiple disk stack column, multiple HSA HDD, according to an embodiment of the invention.

FIG. 4 is a plan view illustrating a multiple disk stack column, multiple HSA HDD, according to an embodiment of the invention. HDD 400 comprises multiple columns 425a, 425b of linearly-arranged disk stack groups such as disk stacks 222a-222n. Each disk stack column 425a, 425b is associated with at least two corresponding HSAs 250a, 250b configured to be translated along a corresponding rail 230 that is positioned between adjacent columns 425a, 425b, and to be fixed into a certain and precise position along the rail 230 relative to each disk stack 222a-222n.

In a multi-HSA 250 embodiment as depicted in FIG. 4, multiple disk stacks 222a-222n may be accessed simultaneously by a respective HSA 250a, 250b after the respective HSA 250a, 250b is moved along the rail 230 to a temporarily fixed position relative to the respective disk stack. The number of pairs of columns 425a, 425b of linearly-arranged disk stacks, and the corresponding number of HSAs 250 and rails 230, may vary from implementation to implementation. For example, an HDD may be configured with multiple pairs of columns of linearly-arranged disk stacks and corresponding HSAs 250 and rails 230.

According to one embodiment, each head stack assembly is configured for movement synchronously with the other head stack assembly. For example, HSA 250a and HSA 250b are moved synchronously with each other, with one HSA 250a servicing one column 425a and the other HSA 250b servicing the other adjacent column 425b. According to another embodiment, each head stack assembly is configured for movement independently of the other head stack assembly. For example, HSA 250a and HSA 250b are moved independently of each other, with one HSA 250a servicing one column 425a and the other HSA 250b servicing the other adjacent column 425b, possibly at different locations along the common rail 230.

With an embodiment having multiple disk stack columns and multiple HSAs, such as HDD 400 having a pair of columns 425a, 425b of linearly-arranged disk stacks and corresponding HSAs 250a, 250b, data may be simultaneously written in various RAID modes. As is known in the art, RAID refers to a storage technology that combines multiple hard disk drive components into a logical unit, whereby data is distributed across the drives in one of several schemes called RAID levels.

With further reference to FIG. 4, according to an embodiment, HDD 400 includes an inner enclosure 480, which encloses the multiple disk stacks 222a-222n, the rail 230, and the HSA 250a and HSA 250b. With this embodiment, the inner enclosure 480 is encased within an outer enclosure 490, with multiple shock mounts 484 positioned between the inner enclosure 480 and the outer enclosure 490. The purpose of the shock mounts 484 is to isolate the inner enclosure 480 and its constituent operational components from vibration, shock, etc. that may be sustained by the outer enclosure 490.

In the foregoing specification, embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. A hard disk drive, comprising:
a plurality of fixed disk stacks, each disk stack comprising one or more magnetic-recording disk rotatably mounted on a spindle;
a head stack assembly movably coupled to a rail, said head stack assembly comprising:
a head slider comprising a magnetic read/write head for reading data from and writing data to one or more magnetic-recording disk,
a flexure, to which said head slider is coupled,
an actuator arm, to which said flexure is coupled, and
an actuator, to which said actuator arm is coupled, said actuator configured to move said head slider to access portions of said one or more magnetic-recording disk of each of the plurality of disk stacks.

2. The hard disk drive of claim 1, wherein said plurality of disk stacks are arranged linearly, and wherein said head stack assembly comprises a single actuator configured to move said head slider to access said portions of said one or more magnetic-recording disk, and wherein said plurality of disk stacks are positioned for asynchronous access.

3. The hard disk drive of claim 2, wherein said rail is positioned substantially parallel to said plurality of disk stacks, and wherein said head stack assembly is configured to be moved and to be temporarily fixed into position along said rail.

4. The hard disk drive of claim 1, consisting of a single head stack assembly coupled to each rail.

5. The hard disk drive of claim 1, wherein said plurality of disk stacks are arranged linearly in a group, said hard disk drive comprising:
a plurality of groups of said linearly-arranged fixed disk stacks; and
a head stack assembly corresponding to each of said plurality of groups.

6. The hard disk drive of claim 5, comprising:
a deflector positioned between each adjacent group of said plurality of groups.

7. The hard disk drive of claim 5, comprising:
a deflector positioned between each adjacent group of said plurality of groups, forming an internal enclosure for each respective group and corresponding head stack assembly.

8. The hard disk drive of claim 1, wherein said plurality of disk stacks are arranged linearly in a first group, said hard disk drive comprising:
a second group of linearly-arranged fixed disk stacks positioned substantially parallel to said first group;
a plurality of head stack assemblies movably coupled to said rail;
wherein said rail is positioned between said first group and said second group; and
wherein said first group and said second group are positioned for simultaneous access by a respective head stack assembly of said plurality of head stack assemblies.

9. The hard disk drive of claim 8, wherein said plurality of head stack assemblies consists of two head stack assemblies, and wherein each head stack assembly is configured to be moved synchronously with the other head stack assembly.

10. The hard disk drive of claim 8, wherein said plurality of head stack assemblies consists of two head stack assemblies, and wherein each head stack assembly is configured to be moved independently of the other head stack assembly.

11. The hard disk drive of claim 1, comprising:
an inner enclosure configured to enclose said plurality of disk stacks, said rail, and said head stack assembly;
an outer enclosure in which said inner enclosure is encased; and
a plurality of shock mounts positioned between said inner enclosure and said outer enclosure.

12. A hard disk drive, comprising:
a plurality of linearly-arranged disk stacks fixed to a base, each disk stack comprising one or more magnetic-recording disk rotatably mounted on a spindle;
a head stack assembly movably coupled to a rail positioned substantially parallel to said plurality of disk stacks, said head stack assembly comprising:
a head slider comprising a magnetic read/write head for reading data from and writing data to one or more magnetic-recording disk, and
an actuator configured to move said head slider to access portions of said one or more magnetic-recording disk of each of the plurality of disk stacks; and
wherein said head stack assembly is configured to be moved along said rail and to be temporarily fixed into position along said rail to access portions of said one or more magnetic-recording disk.

13. The hard disk drive of claim 12, comprising:
a plurality of groups of said linearly-arranged disk stacks;
a head stack assembly corresponding to each of said plurality of groups; and
a deflector positioned between each adjacent group of said plurality of groups.

14. The hard disk drive of claim 13, wherein said deflector forms an internal enclosure for each respective group and corresponding head stack assembly, and wherein said internal enclosure is filled with helium.

15. The hard disk drive of claim 13, comprising:
a plurality of head stack assemblies movably coupled to said rail; and
wherein a first group and a second group of said plurality of groups of disk stacks are positioned for simultaneous access by a respective head stack assembly of said plurality of head stack assemblies.

16. A hard disk drive, comprising:
at least two groups of a plurality of linearly-arranged disk stacks fixed to a base, each disk stack comprising one or more magnetic-recording disk rotatably mounted on a spindle;
a plurality of head stack assemblies movably coupled to a rail positioned between said groups, each head stack assembly comprising:
a head slider comprising a magnetic read/write head for reading data from and writing data to one or more magnetic-recording disk, and
an actuator configured to move said head slider to access portions of said one or more magnetic-recording disk of at least one group of said disk stacks;
wherein each head stack assembly is configured to be moved along said rail and to be temporarily fixed into position along said rail; and wherein a first group and a second group of said at least two groups of disk stacks are positioned for simultaneous access by a respective head stack assembly of said plurality of head stack assemblies.

17. The hard disk drive of claim 16, wherein said plurality of head stack assemblies consists of two head stack assemblies, and wherein each head stack assembly is configured to be moved synchronously with the other head stack assembly.

18. The hard disk drive of claim 16, wherein said plurality of head stack assemblies consists of two head stack assemblies, and wherein each head stack assembly is configured to be moved independently of the other head stack assembly.

* * * * *